US012368242B1

(12) United States Patent
Hamza et al.

(10) Patent No.: US 12,368,242 B1
(45) Date of Patent: Jul. 22, 2025

(54) DUAL-POLARIZED ULTRAWIDEBAND ANTENNAS AND ANTENNA ARRAYS

(71) Applicants: Muhammad Hamza, Miami, FL (US); Stavros Georgakopoulos, Miami, FL (US); Constantinos L. Zekios, Miami, FL (US); Christos Exadaktylos, Miami, FL (US)

(72) Inventors: Muhammad Hamza, Miami, FL (US); Stavros Georgakopoulos, Miami, FL (US); Constantinos L. Zekios, Miami, FL (US); Christos Exadaktylos, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 18/940,998

(22) Filed: Nov. 8, 2024

Related U.S. Application Data

(63) Continuation of application No. 18/677,234, filed on May 29, 2024, now Pat. No. 12,142,850.

(51) Int. Cl.
*H01Q 1/48* (2006.01)
*H01Q 5/25* (2015.01)
*H01Q 9/04* (2006.01)
*H01Q 21/24* (2006.01)

(52) U.S. Cl.
CPC ............. *H01Q 9/0421* (2013.01); *H01Q 1/48* (2013.01); *H01Q 5/25* (2015.01); *H01Q 21/24* (2013.01)

(58) Field of Classification Search
CPC .......... H01Q 9/0421; H01Q 1/48; H01Q 5/25; H01Q 21/24
See application file for complete search history.

(56) References Cited

U.S. PATENT DOCUMENTS

| | | | | |
|---|---|---|---|---|
| 6,369,762 | B1 | 4/2002 | Yanagisawa et al. | |
| 7,109,940 | B1 | 9/2006 | Volman | |
| 7,812,783 | B2 * | 10/2010 | Mak | H01Q 9/0421 343/876 |
| 12,142,850 | B1 * | 11/2024 | Hamza | H01Q 9/0421 |
| 2013/0278467 | A1 | 10/2013 | Dassano et al. | |
| 2013/0285857 | A1 | 10/2013 | Schultz et al. | |
| 2015/0048995 | A1 | 2/2015 | Adrenko | |
| 2018/0309205 | A1 * | 10/2018 | Boryssenko | H01Q 5/25 |

(Continued)

OTHER PUBLICATIONS

Sadegh Mansouri Moghaddam, Jian Yang, Ashraf Uz Zaman, "Fully-Planar Ultrawideband Tightly-Coupled Array (FPU-TCA) With Integrated Feed for Wide-Scanning Millimeter-Wave Applications", IEEE Transactions on Antennas and Propagation, vol. 68, No. 9, Sep. 2020, 11 pages.

(Continued)

*Primary Examiner* — Dameon E Levi
*Assistant Examiner* — Michael M Bouizza
(74) *Attorney, Agent, or Firm* — SALIWANCHIK, LLOYD & EISENSCHENK

(57) ABSTRACT

Dual-polarized ultrawideband antennas and antenna arrays are provided. Fully inverted-L elements (FILEs) can be used as the radiating element in a unit cell antenna, which can be repeated to form an array. The dual-polarized FILE unit cell can include two L-bent elements, which tightly couple to a common shorted via as well as to each other. The same shorted via can be utilized to suppress the well-known common mode resonance.

19 Claims, 22 Drawing Sheets

(56) References Cited

U.S. PATENT DOCUMENTS

| | | | | |
|---|---|---|---|---|
| 2019/0214721 | A1* | 7/2019 | Hu | H01Q 5/385 |
| 2020/0028276 | A1 | 1/2020 | Watson | |
| 2022/0399643 | A1 | 12/2022 | Gimeno Martín et al. | |
| 2023/0253719 | A1 | 8/2023 | Bhattacharya et al. | |
| 2023/0261371 | A1 | 8/2023 | Cai et al. | |
| 2024/0145922 | A1 | 5/2024 | Samardzija et al. | |
| 2024/0213688 | A1 | 6/2024 | Hamza et al. | |

OTHER PUBLICATIONS

Kasemodel et al., "Wideband Planar Array With Integrated Feed and Matching Network for Wide-Angle Scanning", IEEE Transactions on Antennas and Propagation, vol. 61, No. 9, Sep. 2013, 10 pages.

* cited by examiner

DUAL-POLARIZED ULTRAWIDEBAND ANTENNAS AND ANTENNA ARRAYS

CROSS-REFERENCE TO RELATED APPLICATION

The present application is a continuation application of U.S. application Ser. No. 18/677,234, filed May 29, 2024, the disclosure of which is hereby incorporated by reference in its entirety, including all figures, tables, and drawings.

GOVERNMENT SUPPORT

This invention was made with government support under FA9550-18-1-0191 awarded by the Air Force Office of Scientific Research. The government has certain rights in the invention.

BACKGROUND

Significant research has been conducted in the last two decades towards the design of ultra-wideband (UWB) antenna arrays. UWB antenna arrays can be classified into two distinct architectures based on their structure, namely non-planar architectures and planar architectures. Non-planar architectures utilize (i) vertically assembled printed circuit boards (PCBs) or (ii) three-dimensional (3D) manufacturing techniques, including 3D printing, machining, or subtractive manufacturing. However, the scalability of non-planar architectures is limited by the manual assembling procedure required in (i), and the tolerances of the manufacturing method used in (ii). Moreover, the scalability of non-planar designs to high millimeter wave (mmWave) bands becomes even more challenging for dual-polarized arrays, because of the intricate handling of the intersection points between dual-polarized tiles (e.g., soldering of such points).

Planar architectures utilize stacked PCB tiles where multiple layers (conductive or dielectric) are stacked on top of each other with the use of appropriate bonding layers. Notably, the scalability of planar designs is bounded by the tolerance of the employed manufacturing technique (e.g., microwave PCB, low temperature cofired ceramic (LTCC), high temperature cofired ceramic (HTCC), etc.). Microwave PCB is the most cost-effective method, while its manufacturing tolerances are challenging yet non-prohibitive in the high mmWave regime.

BRIEF SUMMARY

Embodiments of the subject invention provide novel and advantageous dual-polarized ultrawideband (UWB) antennas and antenna arrays. Fully inverted-L elements (FILEs) can be used as the radiating elements in a unit cell antenna, which can be repeated to form an array. The dual-polarized FILE (DP-FILE) unit cell can include two L-bent elements, which tightly couple to a common shorted via as well as to each other. The same shorted via can be utilized to suppress the well-known common mode resonance.

In an embodiment, an antenna element can comprise: a ground plane; a first FILE comprising a first antenna conductive line extending parallel to the ground plane and a first feed via electrically connected to a distal end of the first antenna conductive line and extending down through the ground plane; a second FILE comprising a second antenna conductive line extending parallel to the ground plane and a second feed via electrically connected to a distal end of the second antenna conductive line and extending down through the ground plane; and a shorted via connected to the ground plane, the first FILE, and the second FILE. The shorted via can be connected to: a proximal end of the first antenna conductive line opposite from the distal end of the first antenna conductive line; and a proximal end of the second antenna conductive line opposite from the distal end of the second antenna conductive line. The first FILE can be a first radiating element, and the second FILE can be a second radiating element. The proximal end of the first antenna conductive line can be disposed closer to the proximal end of the second antenna conductive line than it is to the distal end of the second antenna conductive line, and the proximal end of the second antenna conductive line can be disposed closer to the proximal end of the first antenna conductive line than it is to the distal end of the first antenna conductive line. The antenna element can further comprise a substrate disposed on the ground plane, and the first antenna conductive line and the second antenna conductive line can be disposed on the substrate. The antenna element can further comprise a superstrate disposed on the first FILE, the second FILE, and the shorted via. The antenna element can have an operating bandwidth of, for example, about 34 gigahertz (GHz) to about 94 GHz (or 34 GHz to 94 GHZ). The antenna element can have a ratio of a highest operating frequency to a lowest operating frequency of at least 2:1 (e.g., at least 2.5:1 or at least 2.75:1). The antenna element can have a highest operating frequency of, for example, at least 80 GHz and a lowest operating frequency of, for example, no more than 40 GHz. The proximal end of the first antenna conductive line can have a hemispherical shape, and the proximal end of the second antenna conductive line can have a hemispherical shape. The first antenna conductive line can extend away from the shorted via in a first direction parallel to the ground plane, and the second antenna conductive line can extend away from the shorted via in a second direction parallel to the ground plane and perpendicular to the first direction.

In another embodiment, a dual-polarized UWB antenna array can comprise a plurality of unit cell antenna elements arranged in an array, each unit cell antenna element being an antenna element having any or all of the features described in the previous paragraph. The antenna array can have a ratio of a highest operating frequency to a lowest operating frequency of at least 2:1 (e.g., at least 2.5:1 or at least 2.75:1). The antenna array can have an operating bandwidth of about 34 GHz to about 94 GHz (e.g., from 34 GHz to 94 GHZ). The antenna array can have a highest operating frequency of, for example, at least 80 GHz and a lowest operating frequency of, for example, no more than 40 GHz. The distal end of the first antenna conductive line of each non-edge unit cell antenna element (i.e., each unit cell antenna element that is not located on an edge of the array) of the plurality of unit cell antenna elements can be spaced apart the proximal end of the second antenna conductive line of an adjacent unit cell antenna element by a predetermined gap (e.g., in a range of from 100 micrometers (μm) to 200 μm, such as 150 μm or about 150 μm). Each unit cell antenna element of the plurality of unit cell antenna elements can have a square shape. A side length of the square shape can be, for example, $0.47\lambda_h$, where $\lambda_h$ is a wavelength at a highest operating frequency of the antenna array (e.g., a side length of (about) 1.5 millimeters (mm) for a highest operating frequency of (about) 94 GHZ).

BRIEF DESCRIPTION OF DRAWINGS

FIGS. 11A-11H show embedded element patterns for a frequency of 30 GHz, 40 GHz, 50 GHz, 60 GHz, 70 GHz, 80 GHz, 90 GHz, and 100 GHz, respectively.

DETAILED DESCRIPTION

Embodiments of the subject invention provide novel and advantageous dual-polarized ultrawideband (UWB) antennas and antenna arrays. Fully inverted-L elements (FILEs) can be used as the radiating elements in a unit cell antenna, which can be repeated to form an array. The dual-polarized FILE (DP-FILE) unit cell can include two L-bent elements, which tightly couple to a common shorted via as well as to each other. The same shorted via can be utilized to suppress the well-known common mode resonance.

In order to lower the cost of the array, a close to optimal spacing (i.e., the width and length of each unit cell) of $0.47\lambda_h$ can be utilized for reduced element number, where $\lambda_h$ is the wavelength at the highest frequency of operation (or cutoff frequency) (i.e., optimal spacing of $0.47c/f_h$, where c is the speed of light and $f_h$ is the highest frequency of operation (or cutoff frequency)). In addition, in order to increase the scanning capabilities, a dual-layer superstrate can be utilized and/or both the substrate and the superstrate can be perforated.

Embodiments provide dual-polarized planar tightly coupled monopole arrays (TCMAs) that can be used for any communication system. The arrays can provide a solution to realize UWB dual-polarized tightly coupled arrays in the W and higher millimeter wave bands. The UWB and wide-scan performance of the dual-polarized antenna array can support all next-generation communication systems.

Figure 12:
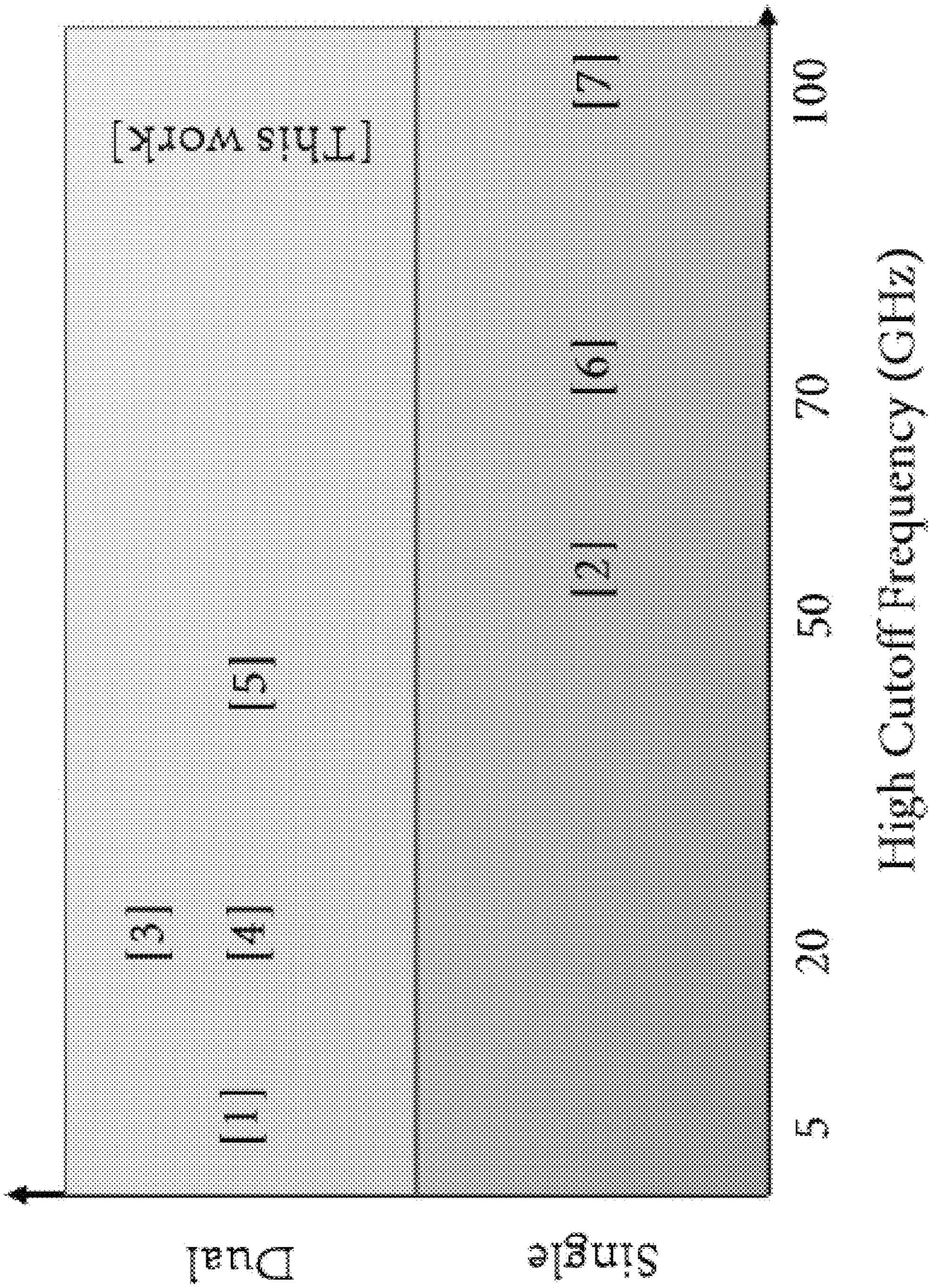
FIG. 12 shows a plot of polarization (single or dual) versus cutoff frequency (in GHZ) for different antennas/antenna arrays. The label "[This work]" is for an array according to an embodiment of the subject invention, showing that it has dual polarization and a high cutoff frequency of about 94 GHZ. The devices labeled "[1]", "[2]", "[3]", "[4]", "[5]", "[6]", and "[7]" are respectively for Doane et al. (A Wideband, Wide Scanning Tightly Coupled Dipole Array With Integrated Balun (TCDA-IB), in IEEE Transactions on Antennas and Propagation, vol. 61, no. 9, pp. 4538-4548 September 2013, doi: 10.1109/TAP.2013.2267199), Alhamed et al., (64-Element 16-52-GHz Transmit and Receive antenna Arrays for Multiband 5G-NR FR2 Operation, in IEEE Transactions on Microwave Theory and Techniques, vol. 71, no. 1, pp. 360-372, January 2023, doi: 10.1109/TMTT.2022.3200415), Kindt et al. (Dual-Polarized Metal-Flare Sliced Notch Antenna Array, in IEEE Transactions on Antennas and Propagation, vol. 68, no. 4, pp. 2666-2674 April 2020, doi: 10.1109/TAP.2020.2969724), Holland et al. (A 7-21 GHZ Dual-Polarized Planar Ultrawideband Modular Antenna (PUMA) Array, in IEEE Transactions on Antennas and Propagation, vol. 60, no. 10, pp. 4589-460 October 2012, doi 10.1109/TAP.2012.2207321), Logan et al. (Planar Ultrawideband Modular Antenna (PUMA) arrays scalable to mm-waves, 2013 IEEE Antennas and Propagation Society International Symposium (APSURSI), Orlando, FL, USA, 2013, pp. 624-625, doi 10.1109/APS.2013.6710972), Novak et al. (Ultra-Wideband antenna Array for Millimeter-Wave ISM and 5G Bands, Realized in PCB," in IEEE Transactions on Antennas and Propagation, vol. 66, no. 12, pp. 6930-6938 December 2018, doi 10.1109/TAP.2018.2872177), and Hamza et al. (A 33-101 GHZ Ultra-Wideband Tightly Coupled Monopole Array (TCMA), 2023 IEEE International Symposium on Antennas and Propagation and USNC-URSI Radio Science Meeting (USNC-URSI), Portland, OR, USA, 2023, pp. 515-516, doi 10.1109/USNC-URSI52151.2023.10237697). All seven of these references are hereby incorporated herein by reference in their entireties.
Figure 13A:
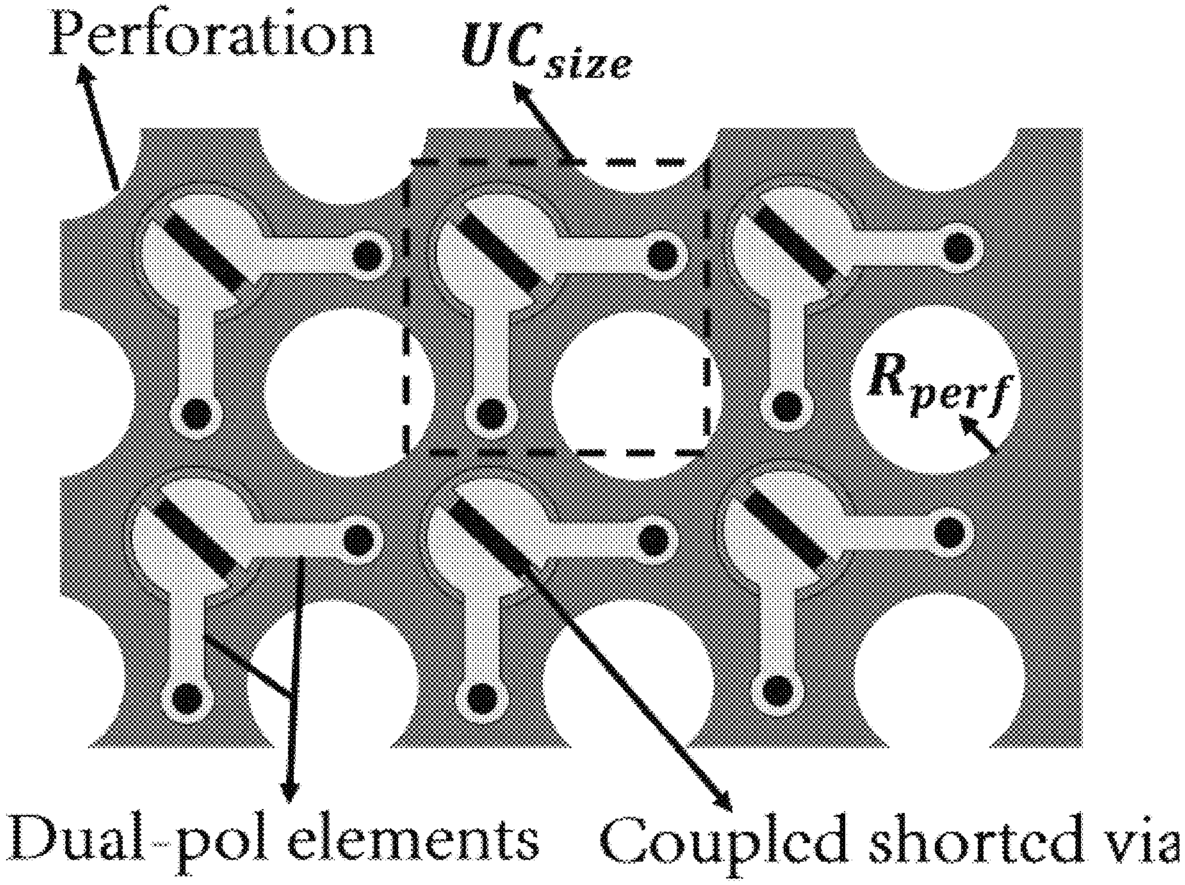
FIG. 13A shows a top view of a small array of dual-polarized fully inverted-L element (DP-FILE) antennas, according to an embodiment of the subject invention.
Figure 13B:
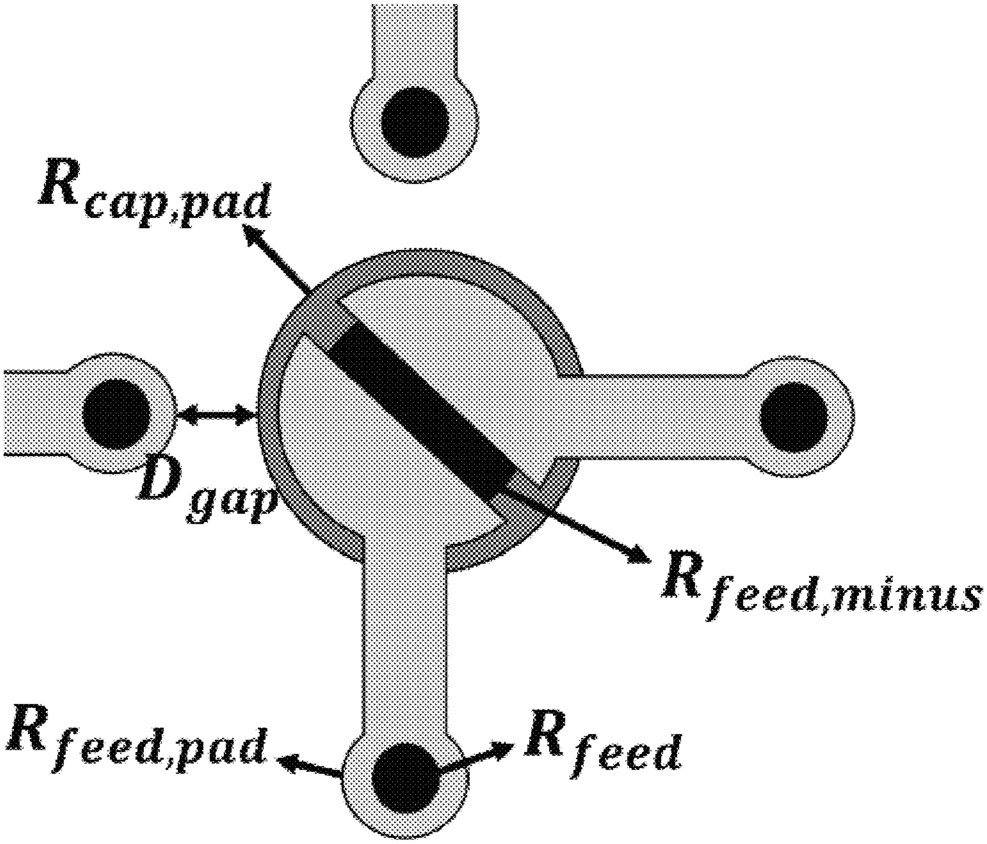
FIG. 13B shows a top view of a zoomed in radiator pair from a unit cell with an antenna (from the array shown in FIG. 13A), along with radiators from a unit cell to the left and above (as depicted in FIG. 13B).
Figure 13C:
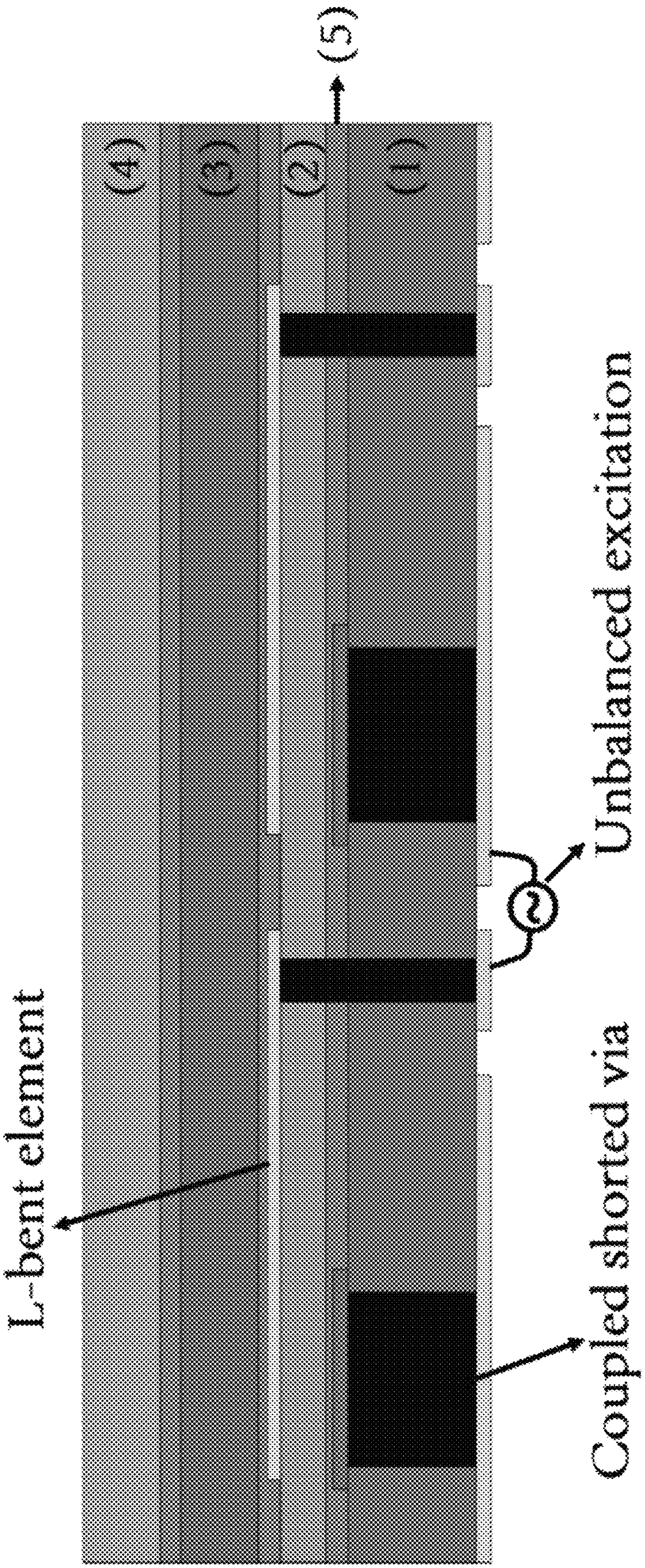
FIG. 13C shows a side view of two unit cells with an antenna (from the array shown in FIG. 13A; only one polarization shown for clarity, though it is dual-polarized)

FIG. 12 summarizes the polarization (single or dual) and cutoff frequency for related art antennas/antenna arrays and the array shown in FIGS. 13A-13C (an embodiment of the subject invention). The label "[This work]" is for an array according to an embodiment of the subject invention, showing that it has dual polarization and a high cutoff frequency of about 94 gigahertz (GHz), while the devices labeled "[1]"-"[7]" are for various related art UWB devices. Though FIG. 12 does not include every related art UWB device, it clearly shows the absence of dual-polarized UWB antenna arrays in the high mmWave bands (50 GHz and above). In order to fill this gap, embodiments of the subject invention provide dual-polarized UWB arrays (FILE array) that operates in a wide range with a high cutoff frequency (e.g., in a range of from 34 GHZ to 94 GHZ) with an active voltage standing wave ratio (VSWR) of less than three and scanning capability up to 45° for all its principal planes (e.g., E-plane, H-plane, and D-plane).

FIGS. 13A-13C show top and side view of unit cells and antenna arrays according to an embodiment of the subject invention. Referring to FIGS. 13A-13C, two orthogonal L-bent elements can be utilized as radiators in each unit cell. The orthogonal sections of the L-elements can couple capacitively to a shorted via as well as to each other to mitigate the inductance of the ground plane at low frequencies. Additionally, the radius of the shorted via can be increased to suppress the mid-band common mode resonance and push it to higher frequencies. A unit cell size of $0.47\lambda_h$ (where $\lambda_h$ is the wavelength at the highest frequency of operation) can be chosen to minimize the element number and equivalently the cost of the array (i.e., length and width can each be $0.47\lambda_h$). For example, for a highest frequency of 94 GHZ, the unit cell size (i.e., length and width each) can be 1.5 millimeters (mm). A dual-layer superstrate (see FIG. 13C) in combination with perforations in its dielectric layers (see also FIG. 13A) can be employed to achieve favorable performance over high scan angles at all planes (e.g., E-plane, D-plane, and H-plane). Importantly, the unit cell can be designed to satisfy standard PCB tolerances (see also Novak et al. and Hamza et al., supra.). A simulation in an infinite array environment demonstrated a 2.75:1 operational bandwidth (34 GHz to 94 GHZ) with a maximum scan angle of 45° and orthogonal port coupling less than-10 decibels (dB) for all principal planes (e.g., E-, H- and D-planes).

Some possible exemplary dimensions (should not be construed as limiting) for the antenna elements shown in FIGS. 13A-13C are as follows: $UC_{size}$=1500 micrometers (μm), $R_{perf}$=400 μm, $D_{gap}$=150 μm, $R_{feed}$=75 μm, $R_{feed,pad}$=150 μm, $R_{feed,minus}$=300 μm, $R_{cap,pad}$=350 μm. Some possible exemplary materials (should not be construed as limiting) for the layers shown in FIG. 13C are as follows: (1) RT/duroid 5880LZ 15 millimeter (ml) (perforated); (2) RT/duroid 5880 5 ml (perforated); (3) RT/duroid 5880LZ 10 ml (perforated); (4) RT/duroid 6002 10 ml (non-perforated); and (5) DuPont Pyralux HP250000.

Figure 1:
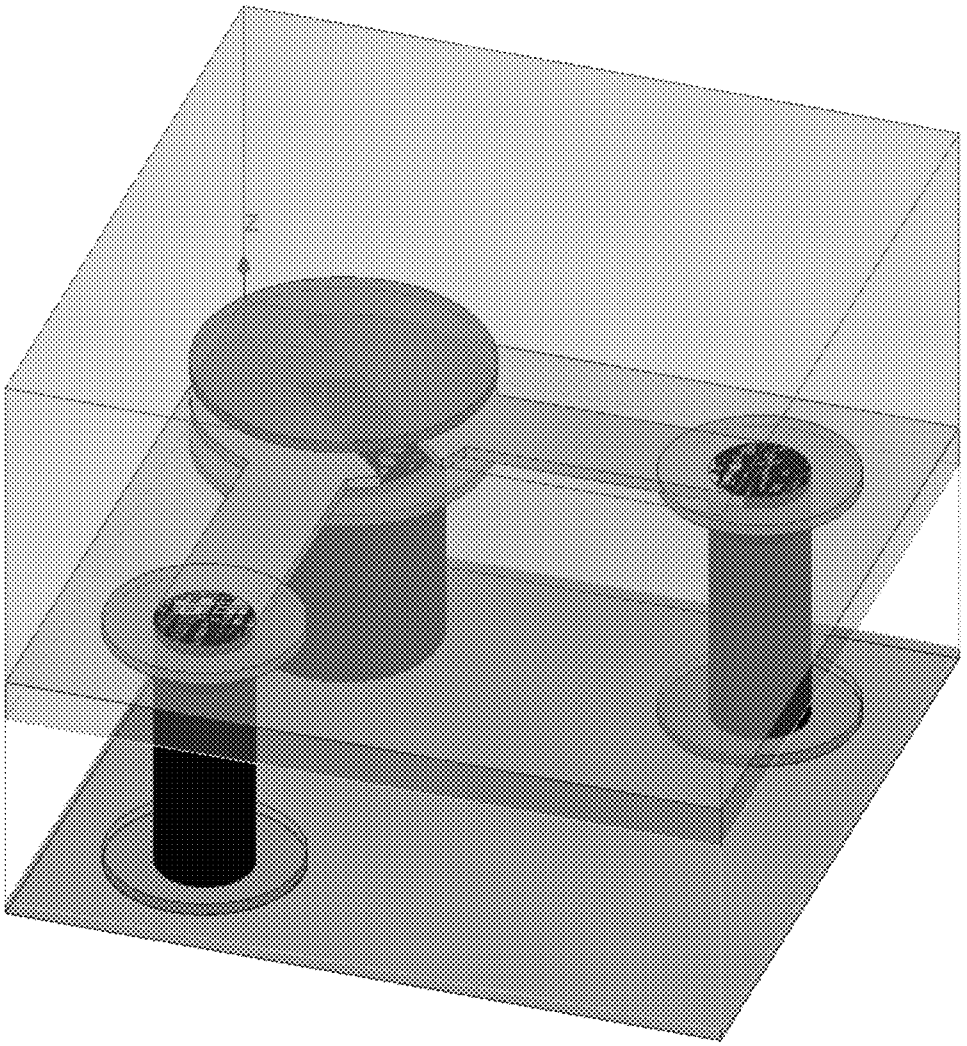
FIG. 1 shows a view of a unit cell with an antenna, according to an embodiment of the subject invention.
Figure 2:
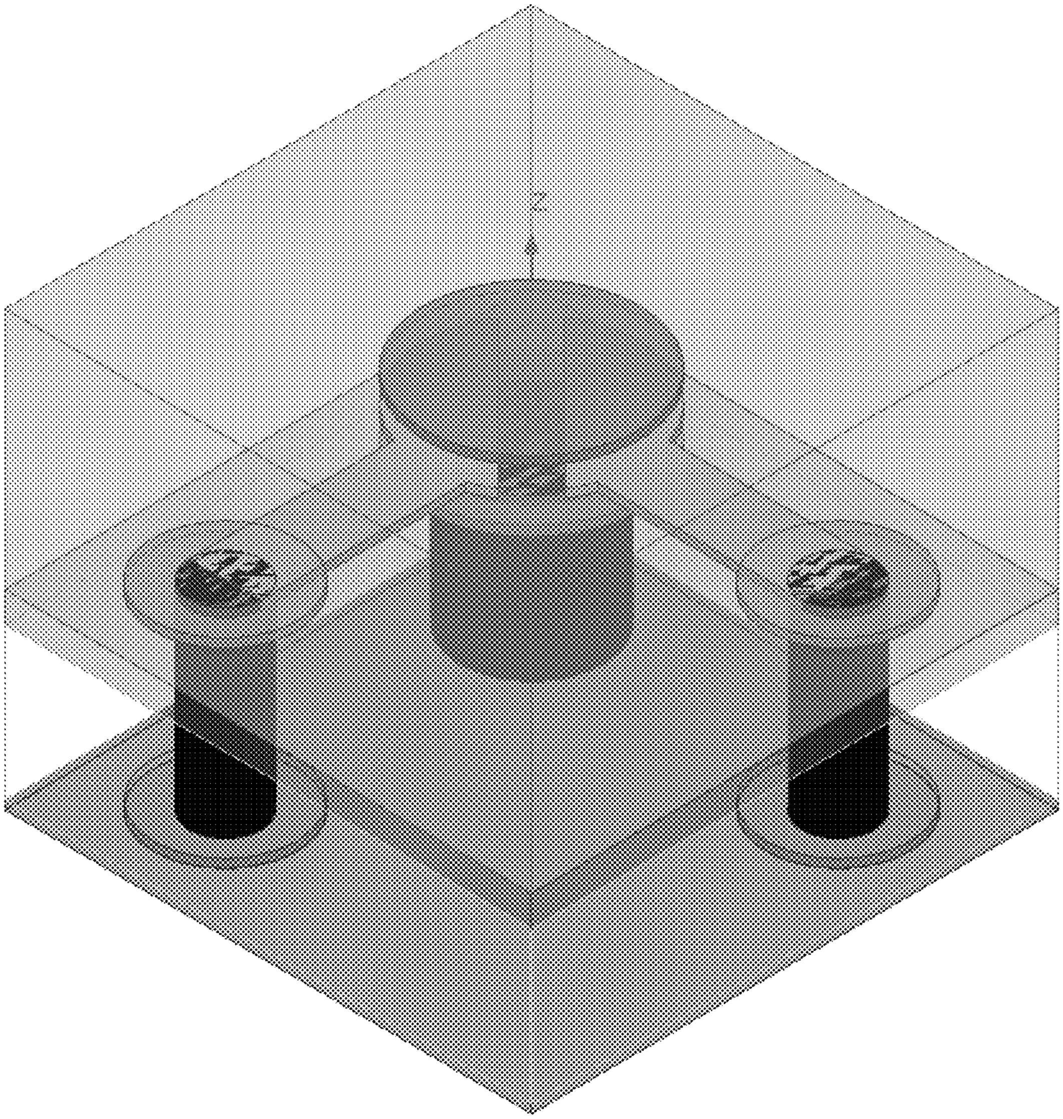
FIG. 2 shows a view of a unit cell with an antenna, according to an embodiment of the subject invention.
Figure 3:
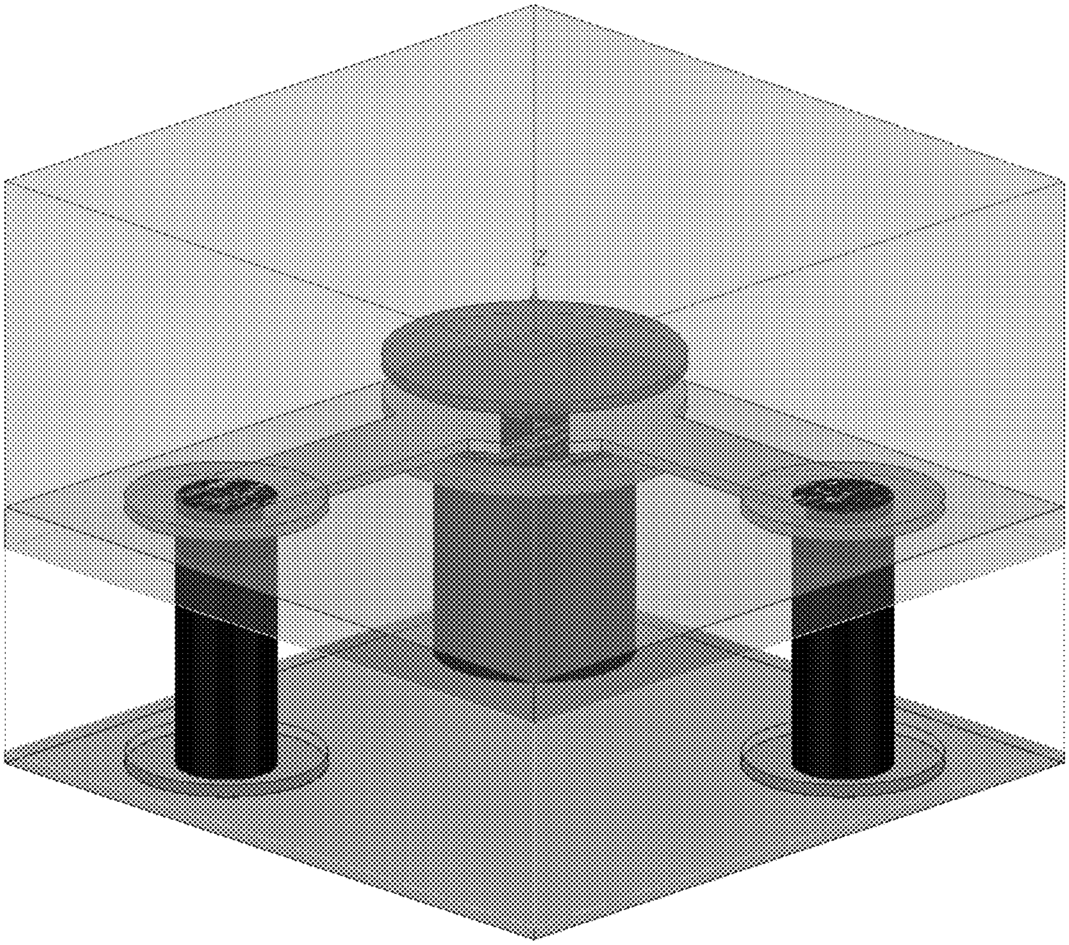
FIG. 3 shows a view of a unit cell with an antenna, according to an embodiment of the subject invention.
Figure 4:
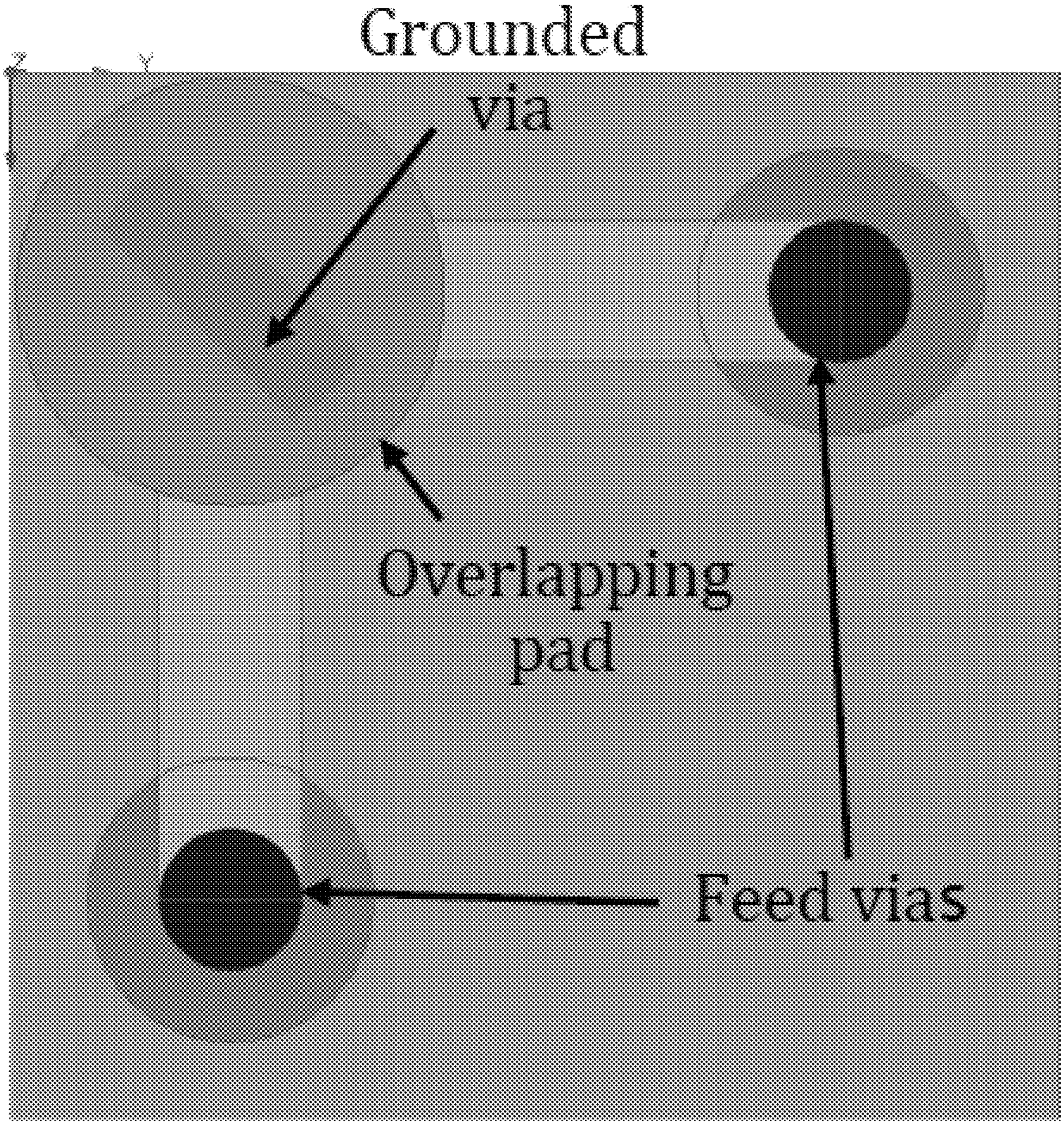
FIG. 4 shows a top view of a unit cell with an antenna, according to an embodiment of the subject invention.
Figure 5:
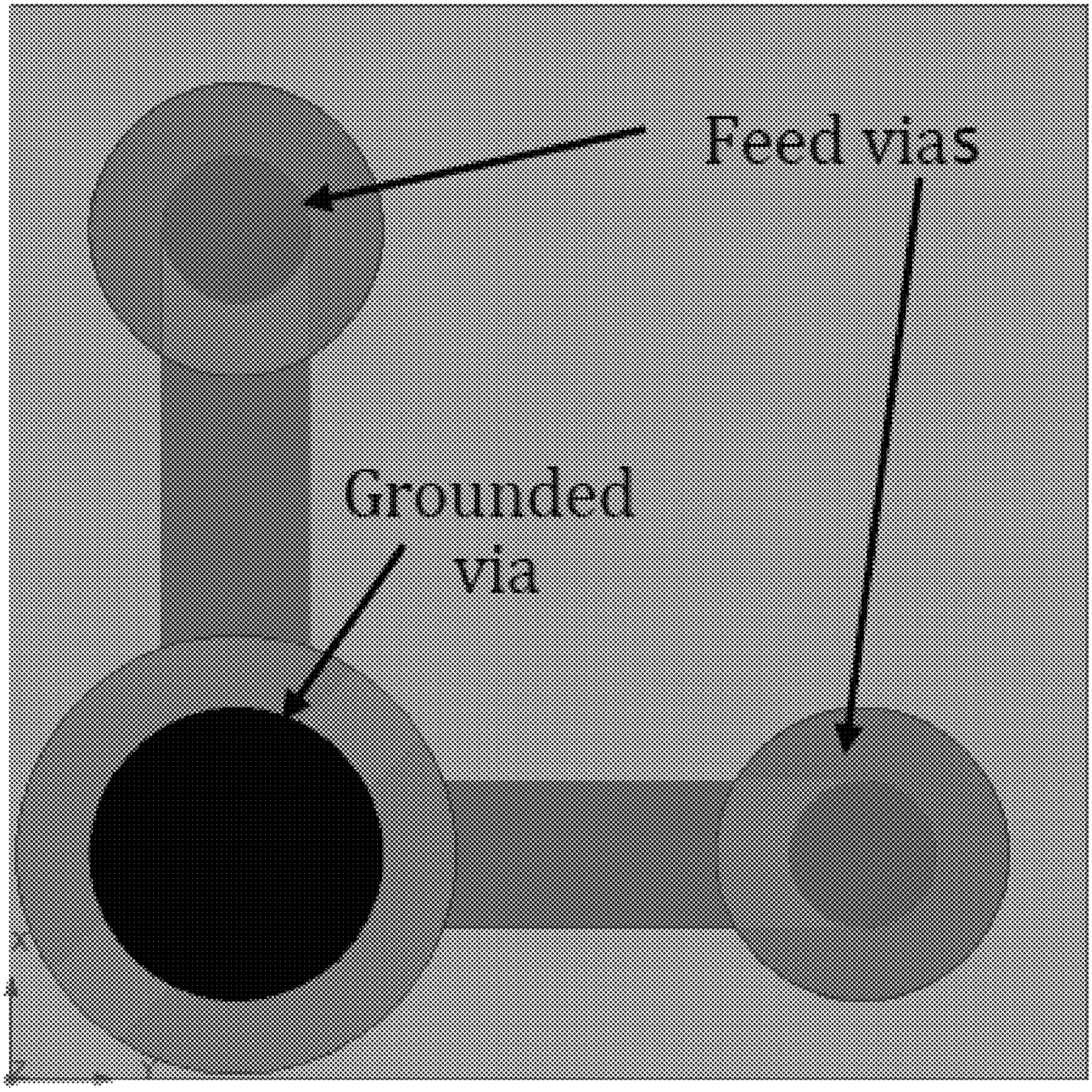
FIG. 5 shows a bottom view of a unit cell with an antenna, according to an embodiment of the subject invention.
Figure 6:
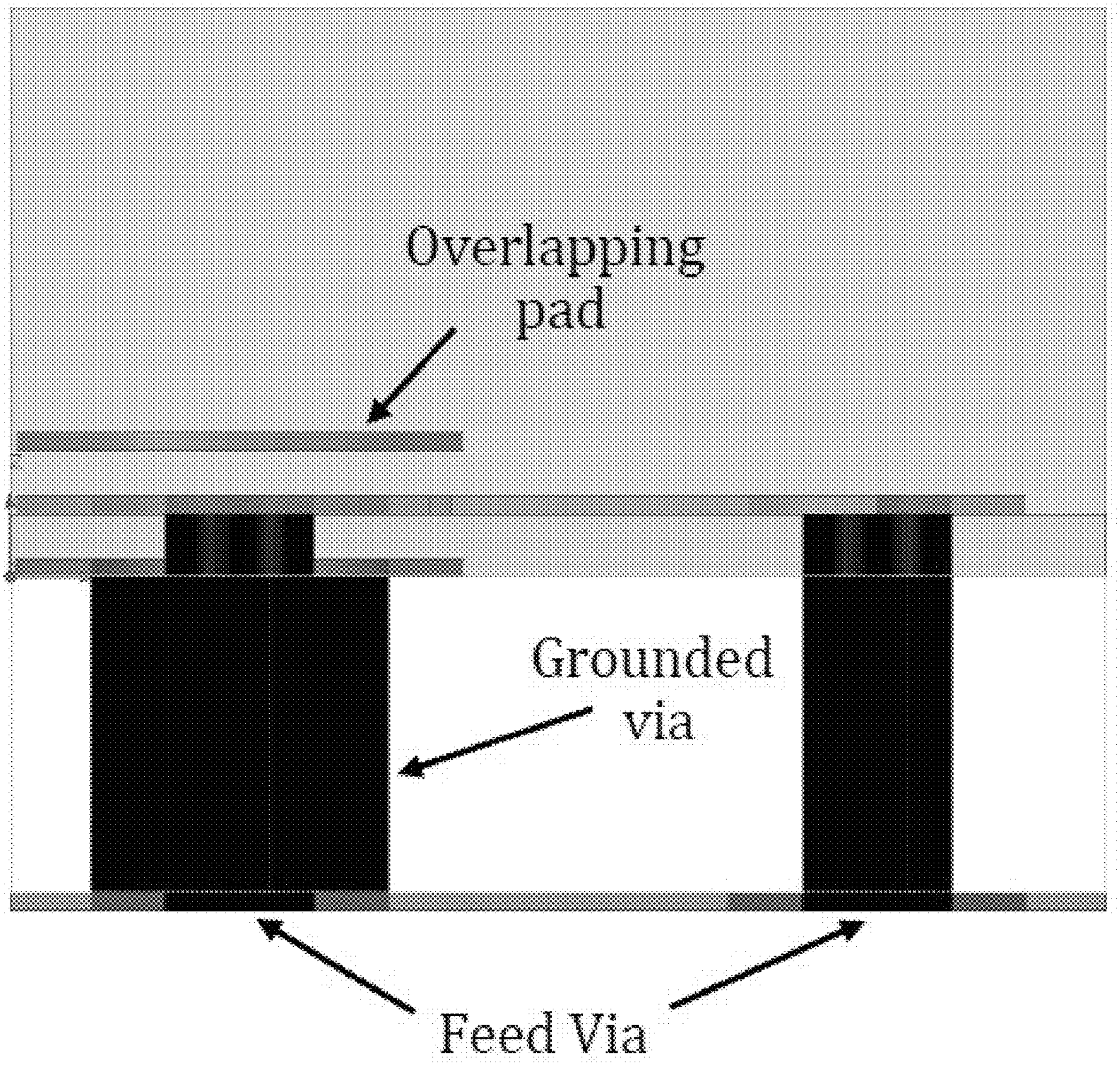
FIG. 6 shows a side view of a unit cell with an antenna, according to an embodiment of the subject invention.
Figure 7:
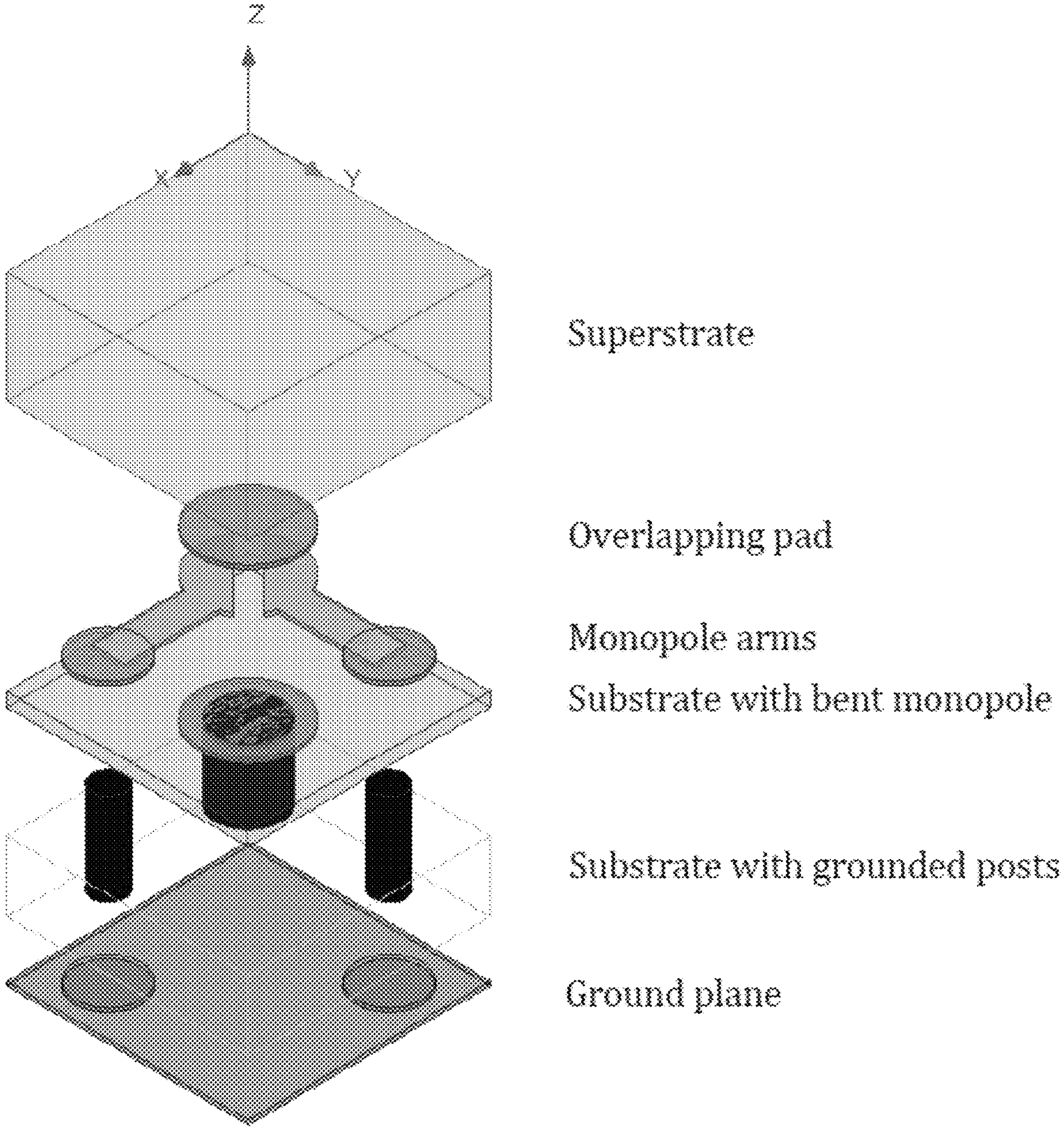
FIG. 7 shows an exploded view of a unit cell with an antenna, according to an embodiment of the subject invention.
Figure 8:
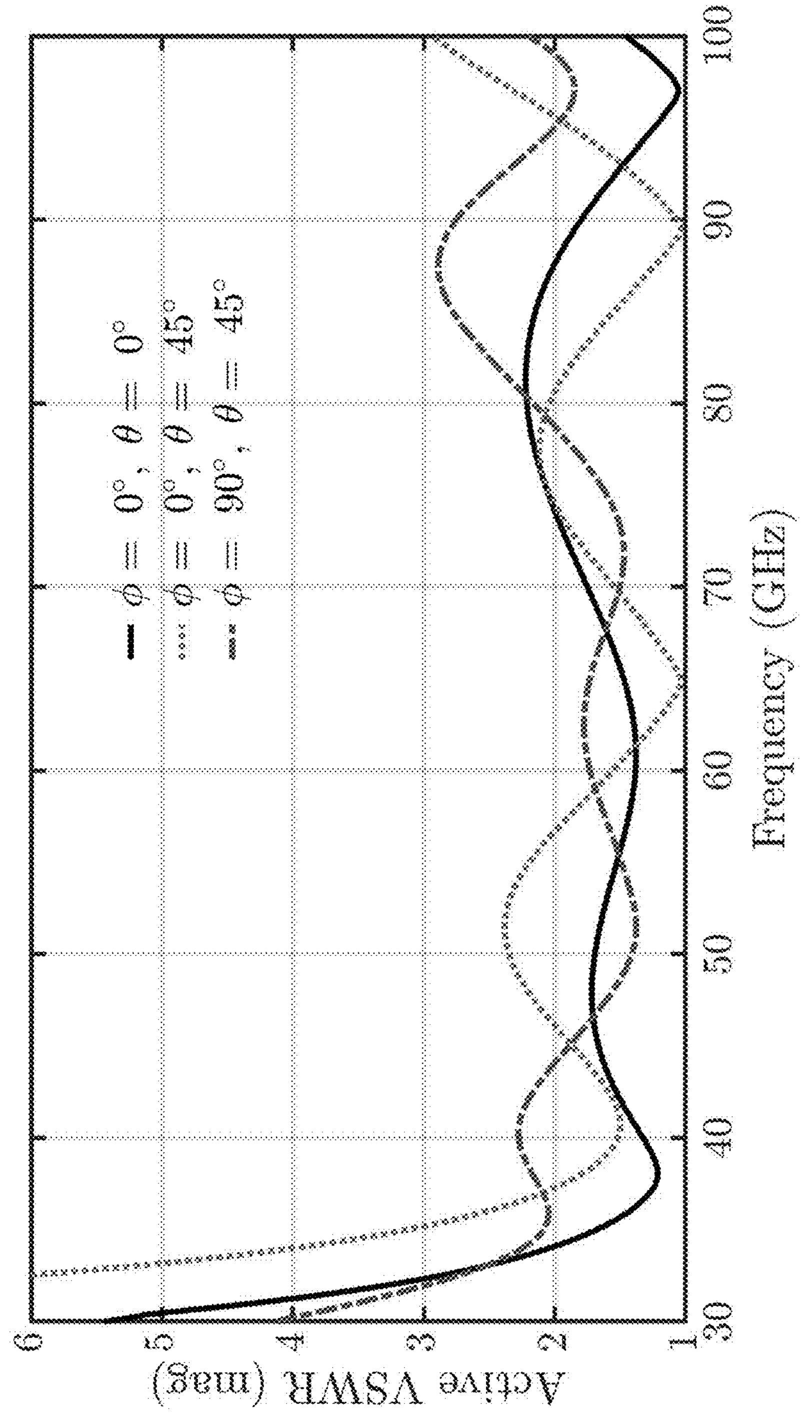
FIG. 8 shows a plot of active voltage standing wave ratio (VSWR) (magnitude (mag)) versus frequency (in gigahertz (GHz)) for an array of 16×16 unit cells, where each unit cell is as depicted in FIGS. 1-7. The (black) solid curve is for $\phi=0°$ and $\theta=0°$; the (red) dotted curve is for $\phi=0°$ and $\theta=45°$; and the (blue) dashed curve is for $\phi=90°$ and $\theta=45°$.
Figure 9A:
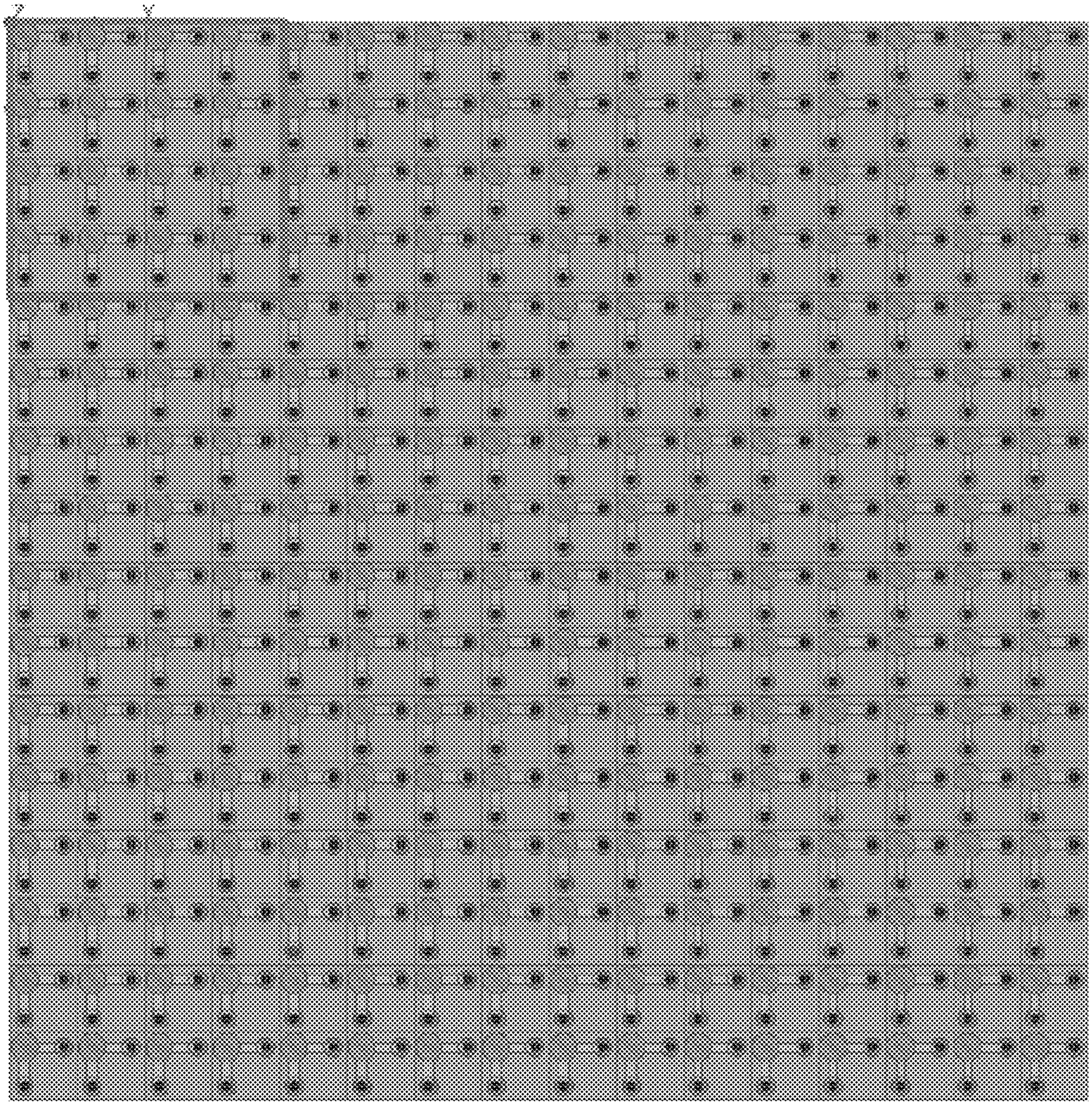
FIG. 9A shows a top view of an array of 16×16 unit cells, where each unit cell is as depicted in FIGS. 1-7.
Figure 9B:
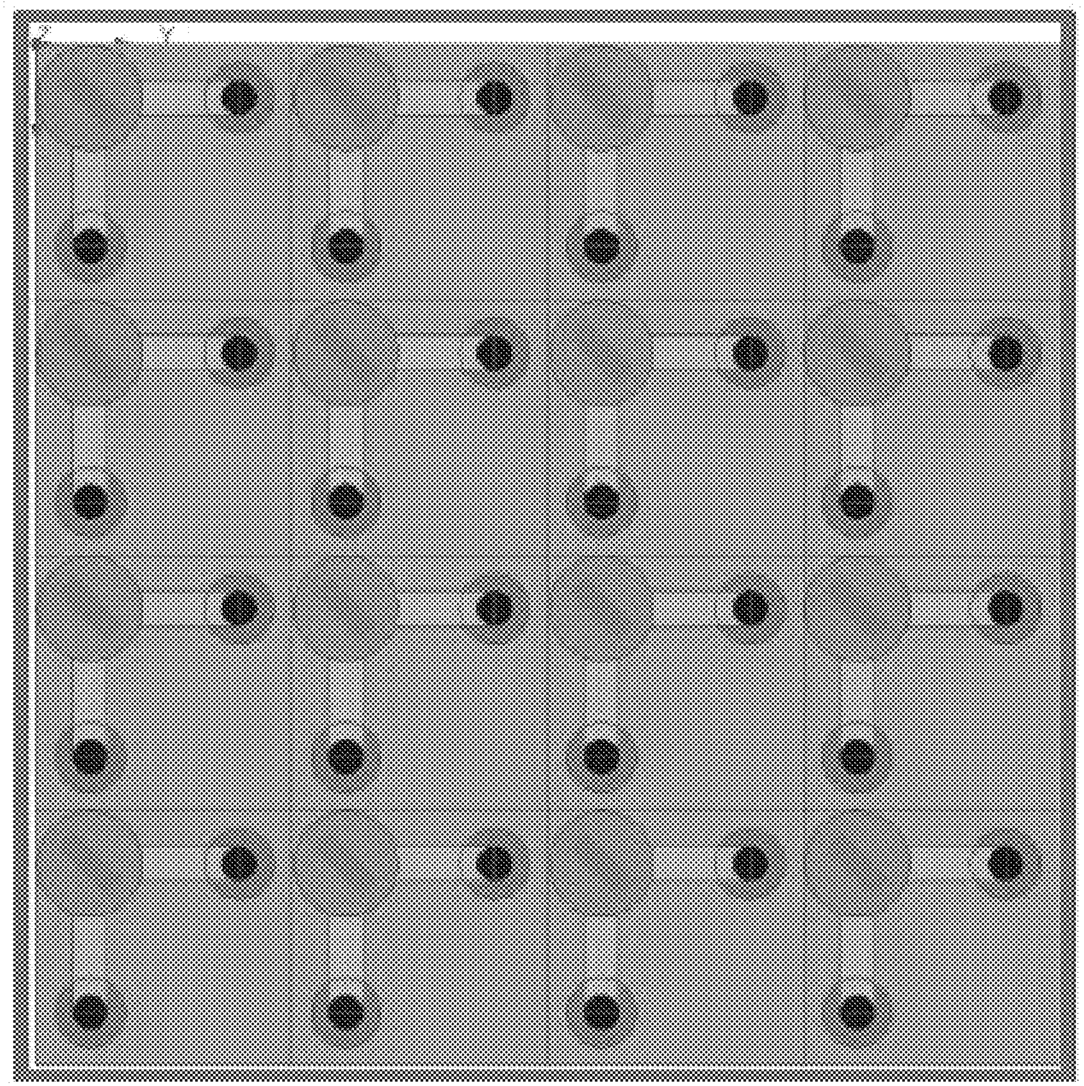
FIG. 9B shows a closeup of the highlighted box from the upper-left portion of FIG. 9A (i.e., the 16 unit cells in the upper-left portion of the array in FIG. 9A).
Figure 10A:
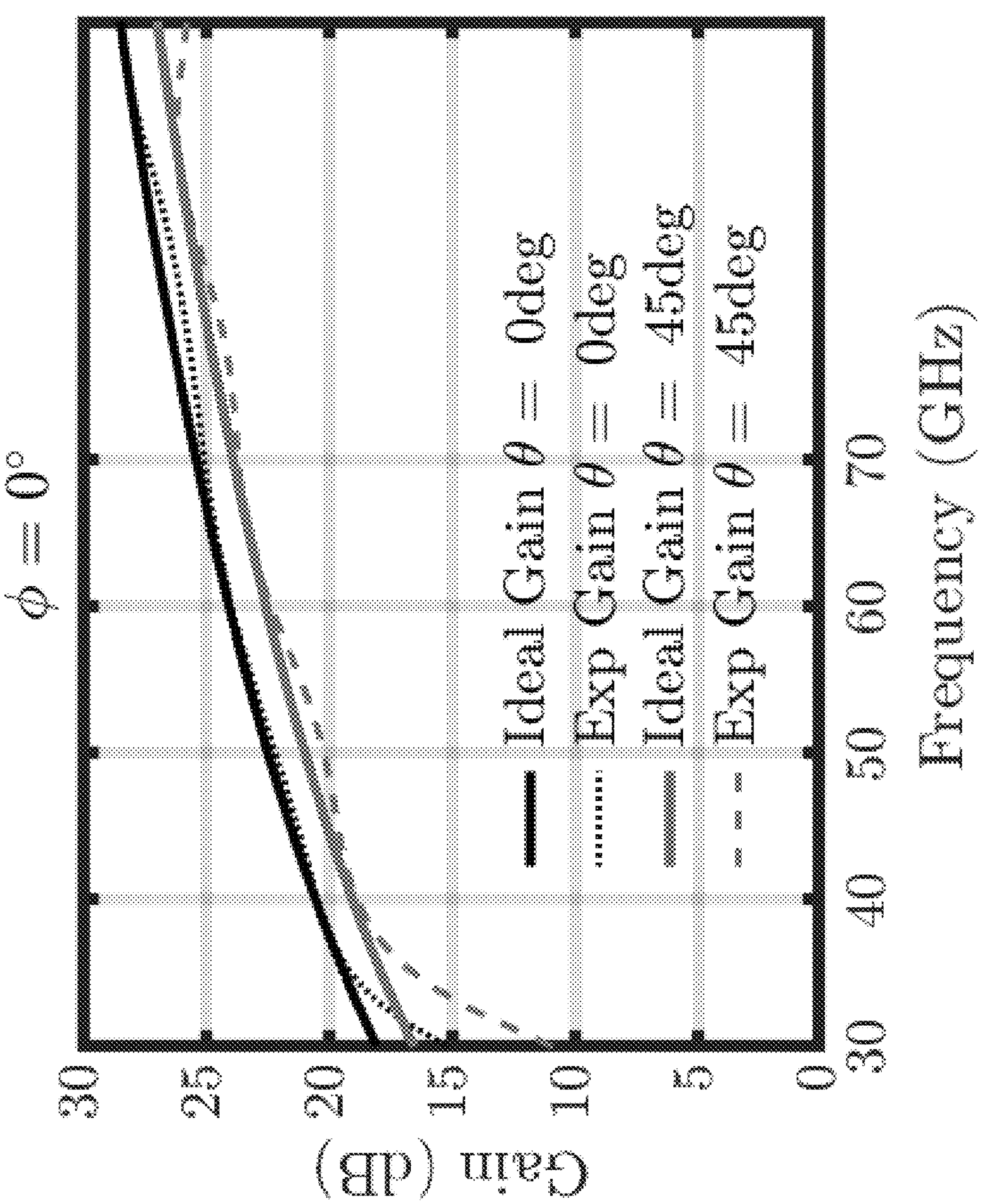
FIG. 10A shows a plot of gain (in decibels (dB)) versus frequency (in GHz) for an array of 16×16 unit cells at $\phi=0°$, where each unit cell is as depicted in FIGS. 1-7. The (black) solid curve with the higher gain values is for ideal gain at $\theta=0°$; the (black) dotted curve is for expected gain at $\theta=0°$; the (red) solid curve with the lower gain values is for ideal gain at $\theta=45°$; and the (red) dashed curve is for expected gain at $\theta=45°$.
Figure 10B:
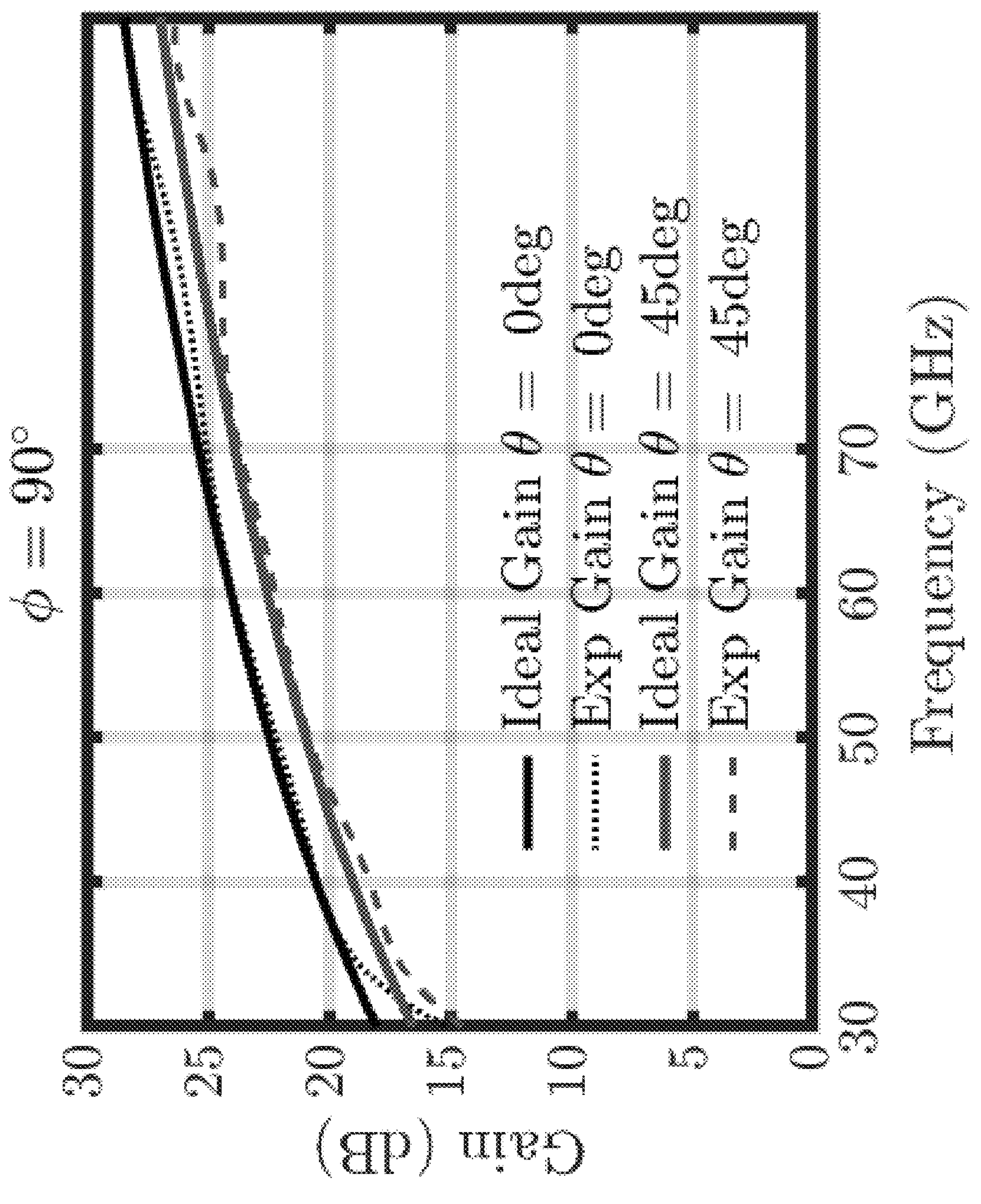
FIG. 10B shows a plot of gain (in decibels (dB)) versus frequency (in GHz) for an array of 16×16 unit cells at $\phi=90°$, where each unit cell is as depicted in FIGS. 1-7. The (black) solid curve with the higher gain values is for ideal gain at $\theta=0°$; the (black) dotted curve is for expected gain at $\theta=0°$; the (blue) solid curve with the lower gain values is for ideal gain at $\theta=45°$; and the (blue) dashed curve is for expected gain at $\theta=45°$.
Figure 11A:
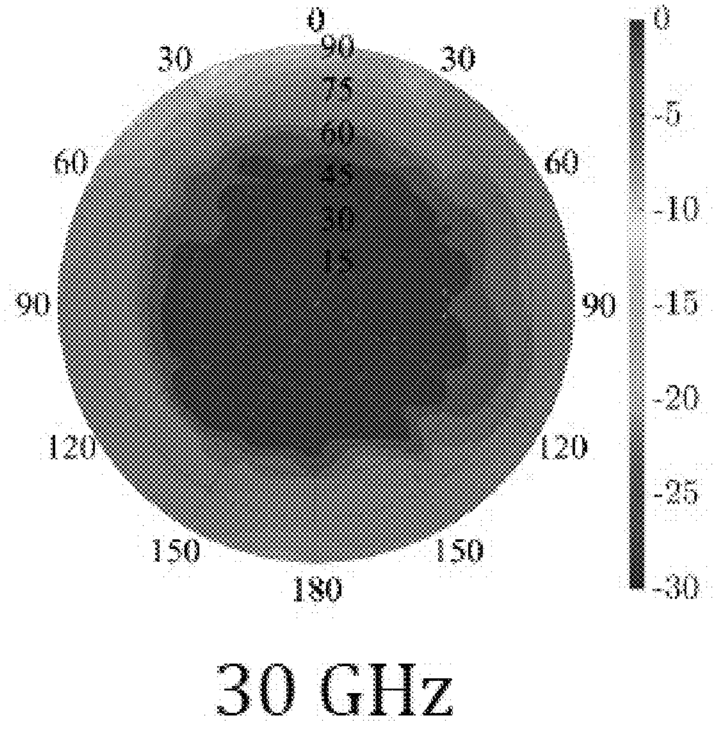
FIGS. 11A-11H shows embedded patterns for an array of 16×16 unit cells, each showing no null for all $\phi$ and $\theta$ less than or equal to 45°, where each unit cell is as depicted in FIGS. 1-7.
Figure 11B:
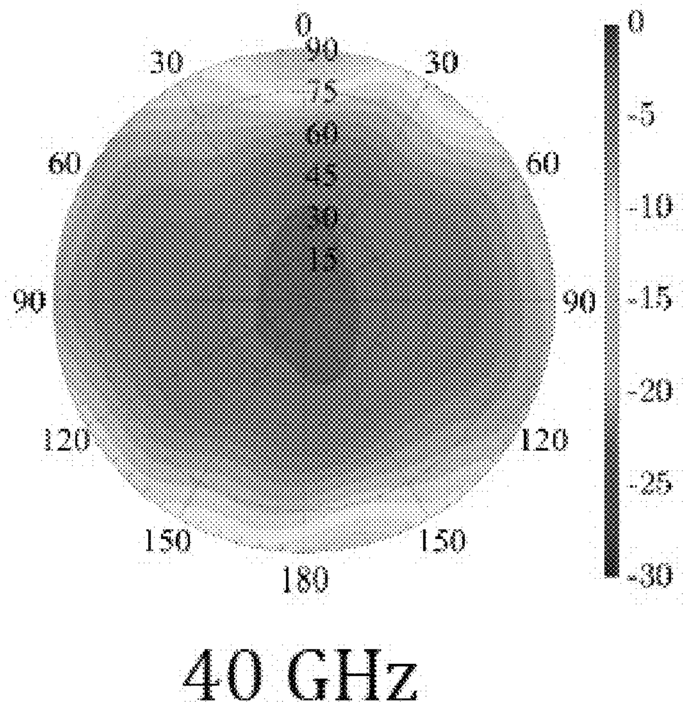
Figure 11C:
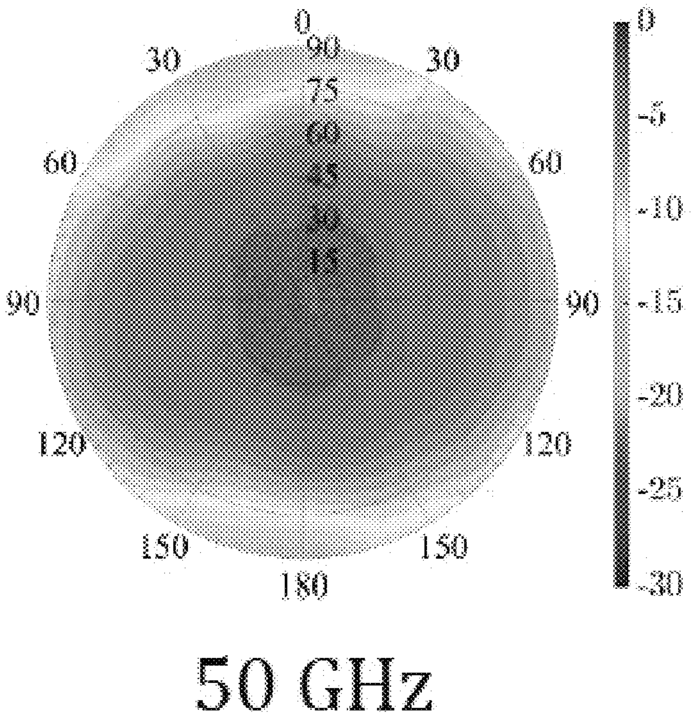
Figure 11D:
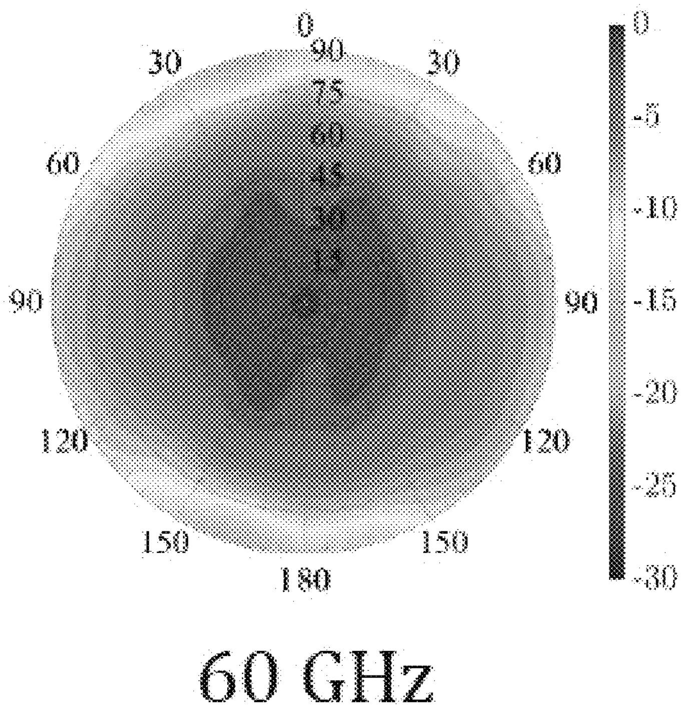
Figure 11E:
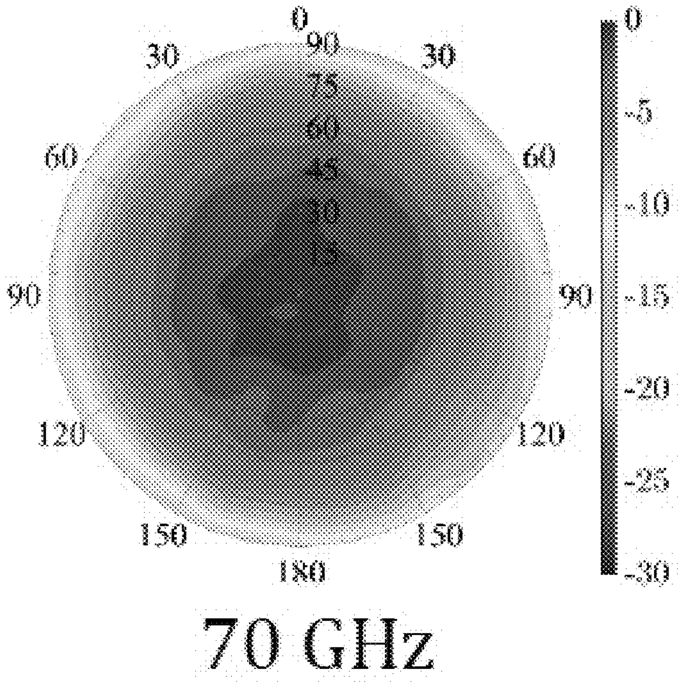
Figure 11F:
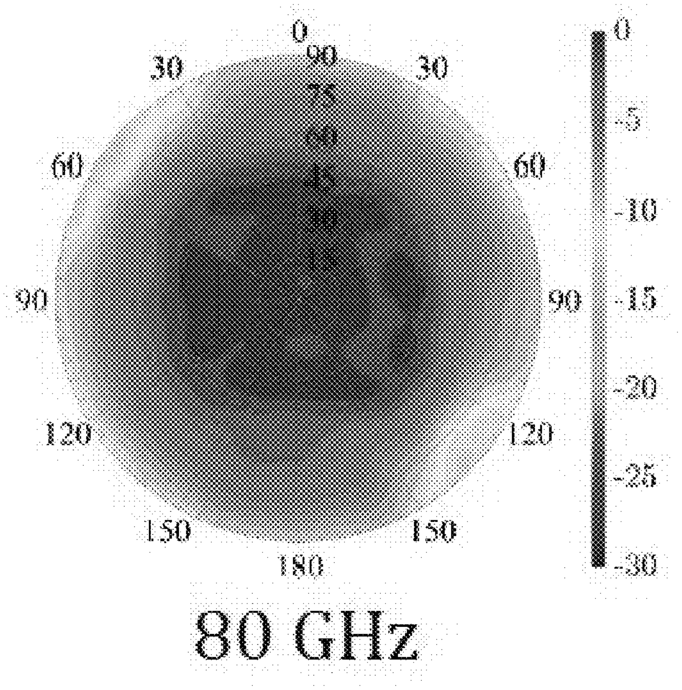
Figure 11G:
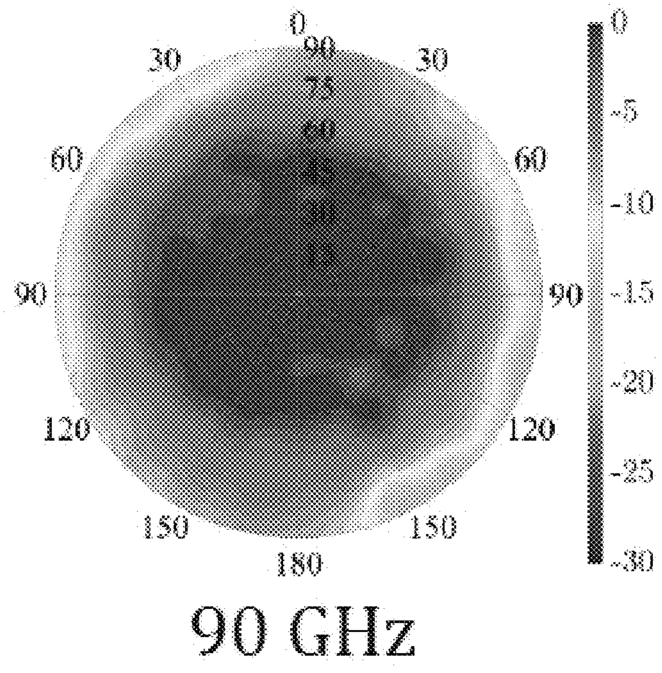
Figure 11H:
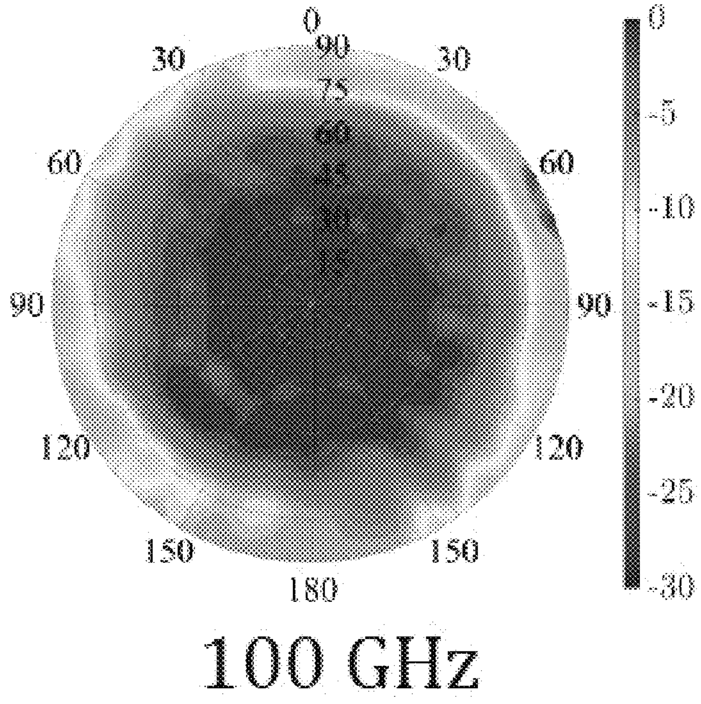

FIGS. 1-7 show a unit cell of an antenna element, according to an embodiment of the subject invention. FIGS. 9A and 9B show a top view of an array of these unit cells. These figures show a slightly different version (compared to that in FIGS. 13A-13C). For example, this version does not have the perforations in the substrate and the superstrate; nor does it have a dual-layer superstrate.

Embodiments of the subject invention provide dual-polarized UWB arrays utilizing FILEs. The ratio of the highest frequency to the lowest frequency for the antenna elements and/or the array can be, for example, at least 2:1, at least 2.5:1, at least 2.6:1, or at least 2.75:1 (e.g., about 2.76:1). The highest frequency (or cutoff frequency) of the antenna elements and/or the array can be, for example, at least 50 GHz, at least 60 GHz, at least 70 GHz, at least 80 GHz, at least 90 GHz, or at least 94 GHz (e.g., 94 GHz or about 94 GHZ). The lowest frequency of the antenna elements and/or the array can be, for example, no more than 50 GHz, no more than 40 GHz, no more than 35 GHz, or no more than 34 GHz (e.g., 34 GHz or about 34 GHz). To the best of the knowledge of the inventors, this is the first dual-polarized UWB array operating from 34 GHz up to 94 GHz, while satisfying standard PCB tolerances. The simulated results demonstrate active VSWR less than three and orthogonal port coupling less than-10 dB over the frequency band of operation.

This application has certain elements in common with U.S. patent application Ser. No. 18/315,006, which is hereby incorporated by reference herein in its entirety.

When ranges are used herein, such as for dose ranges, combinations and subcombinations of ranges (e.g., subranges within the disclosed range), specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

Example 1

The unit cell as depicted in FIGS. 13A-13C was simulated in Ansys HFSS using periodic boundary conditions imitating an infinite array environment. The dimensions and materials were as follows: $UC_{size}$=1500 μm; $R_{perf}$=400 μm; $D_{gap}$=150 μm; $R_{feed}$=75 μm; $R_{feed:pad}$=150 μm; $R_{feed:minus}$=300 μm; $R_{cap:pad}$=350 μm; (1) RT/duroid 5880LZ 15 millimeter (ml) (perforated); (2) RT/duroid 5880 5 ml (perforated); (3) RT/duroid 5880LZ 10 ml (perforated); (4) RT/duroid 6002 10 ml (non-perforated); and (5) DuPont Pyralux HP250000.

Figure 14A:
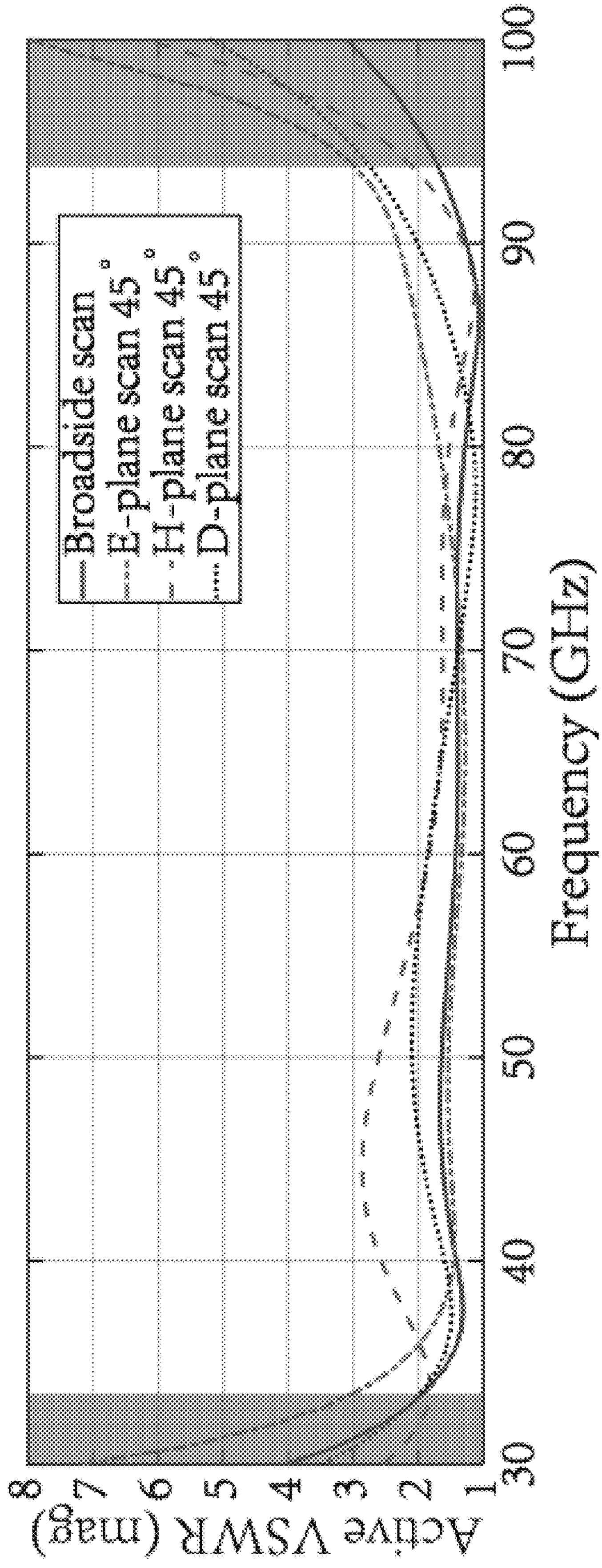
FIG. 14A shows a plot of active VSWR (mag) versus frequency (in GHz) for an array of unit cells, where each unit cell is as depicted in FIGS. 13A-13C. The (blue) solid curve is for broadside scan; the (black) dotted curve is for D-plane scan 45°; the (green) dashed curve is for H-plane scan 45°; and the (red) dot-dash curve is for E-plane scan 45°.
Figure 14B:
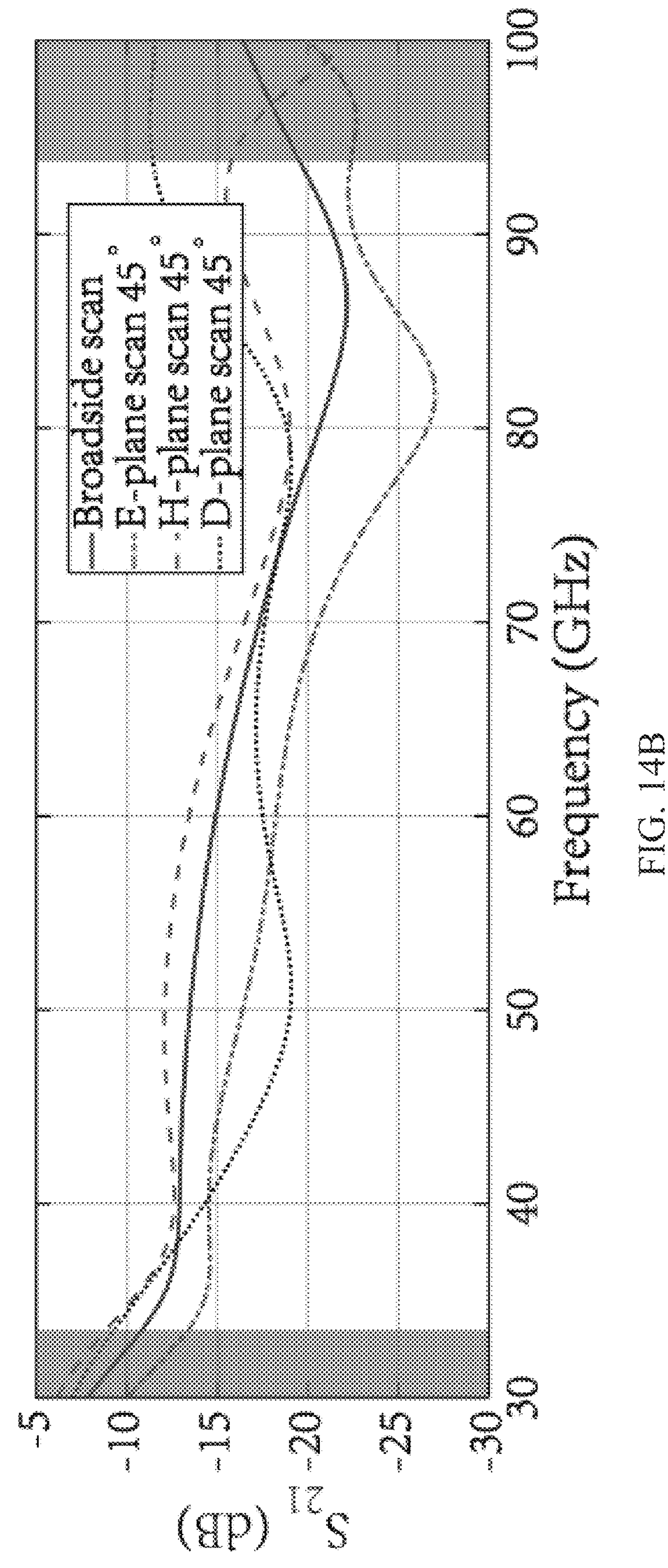
FIG. 14B shows a plot of active $S_{21}$ (in dB) versus frequency (in GHz) for an array of unit cells, where each unit cell is as depicted in FIGS. 13A-13C. The (blue) solid curve is for broadside scan; the (black) dotted curve is for D-plane scan 45°; the (green) dashed curve is for H-plane scan 45°; and the (red) dot-dash curve is for E-plane scan 45°.

The active VSWR is shown in FIG. 14A. Notably, the active VSWR is less than 3 from 34 GHz to 94 GHZ (2.75:1 bandwidth ratio), while scanning up to 45° in the E-, H-, and D-planes. FIG. 14B shows the orthogonal port coupling under the same scanning conditions, which stays below −10 dB throughout most of the operational frequency band (34 GHz to 94 GHZ). Only the H- and D-planes at the low frequency edge (34 GHZ) show a slightly worse coupling of the order of −9 dB, which can be attributed to the excitation of a loop mode. Notably, near the high frequency edge (94 GHZ), the D-plane demonstrates the highest orthogonal port coupling, namely-12 dB, which is a common phenomenon in dipole as well as Vivaldi arrays due to the high X-pol produced by the existence of strong vertical currents.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna element, comprising:

a ground plane;

a first fully inverted-L element (FILE) comprising a first antenna conductive line extending parallel to the ground plane and a first feed via electrically connected to a distal end of the first antenna conductive line and extending down through the ground plane;

a second FILE comprising a second antenna conductive line extending parallel to the ground plane and a second feed via electrically connected to a distal end of the second antenna conductive line and extending down through the ground plane; and a shorted via connected to the ground plane, the first FILE, and the second FILE, the shorted via being connected to a proximal end of the first antenna conductive line opposite from the distal end of the first antenna conductive line, the shorted via being connected to a proximal end of the second antenna conductive line opposite from the distal end of the second antenna conductive line, the first FILE being a first radiating element, the second FILE being a second radiating element, the proximal end of the first antenna conductive line having a first hemispherical shape with a first curved portion and a first straight edge portion along an entirety of a diameter of the first hemispherical shape, the proximal end of the second antenna conductive line having a hemispherical shape with a second curved portion and a second straight edge portion along an entirety of a diameter of the second hemispherical shape, the first straight edge portion of the proximal end of the first antenna conductive line directly facing an entirety of the second straight edge portion of the proximal end of the second antenna conductive line.

2. The antenna element according to claim 1, further comprising a superstrate disposed on the first FILE, the second FILE, and the shorted via.

3. The antenna element according to claim 2, the antenna element having a ratio of a highest operating frequency to a lowest operating frequency of at least 2:1.

4. The antenna element according to claim 1, the proximal end of the first antenna conductive line being disposed closer to the proximal end of the second antenna conductive line than it is to the distal end of the second antenna conductive line, and the proximal end of the second antenna conductive line being disposed closer to the proximal end of the first antenna conductive line than it is to the distal end of the first antenna conductive line.

5. The antenna element according to claim 1, further comprising a substrate disposed on the ground plane, the first antenna conductive line and the second antenna conductive line being disposed on the substrate.

6. The antenna element according to claim 1, further comprising a superstrate disposed on the first FILE, the second FILE, and the shorted via.

7. The antenna element according to claim 1, the antenna element having an operating bandwidth of about 34 gigahertz (GHz) to about 94 GHz.

8. The antenna element according to claim 1, the antenna element having a ratio of a highest operating frequency to a lowest operating frequency of at least 2:1.

9. The antenna element according to claim 8, the ratio of the highest operating frequency to the lowest operating frequency being at least 2.75:1.

10. The antenna element according to claim 1, the antenna element having a highest operating frequency of at least 80 GHz.

11. The antenna element according to claim 10, the antenna element having a lowest operating frequency of no more than 40 GHz.

12. The antenna element according to claim 1, the first antenna conductive line extending away from the shorted via in a first direction parallel to the ground plane, and the second antenna conductive line extending away from the shorted via in a second direction parallel to the ground plane and perpendicular to the first direction.

13. A dual-polarized ultrawideband antenna array, the antenna array comprising:

a plurality of unit cell antenna elements arranged in an array, each unit cell antenna element being the antenna element according to claim 1, the antenna array having a ratio of a highest operating frequency to a lowest operating frequency of at least 2:1.

14. The antenna array according to claim 13, the antenna array having an operating bandwidth of about 34 gigahertz (GHz) to about 94 GHz.

15. The antenna array according to claim 14, each unit cell antenna element of the plurality of unit cell antenna elements having a square shape with a side length of $0.47\lambda_h$, where $\lambda_h$ is a wavelength at a highest operating frequency of the antenna array, and the ratio of the highest operating frequency to the lowest operating frequency being at least 2.75:1.

16. The antenna array according to claim 13, the distal end of the first antenna conductive line of each non-edge unit cell antenna element of the plurality of unit cell antenna elements being spaced apart the proximal end of the second antenna conductive line of an adjacent unit cell antenna element by a predetermined gap, and the predetermined gap being in a range of from 100 micrometers (μm) to 200 μm.

17. An antenna element, comprising:

a ground plane;

a first fully inverted-L element (FILE) comprising a first antenna conductive line extending parallel to the ground plane and a first feed via electrically connected to a distal end of the first antenna conductive line and extending down through the ground plane;

a second FILE comprising a second antenna conductive line extending parallel to the ground plane and a second feed via electrically connected to a distal end of the second antenna conductive line and extending down through the ground plane;

a shorted via connected to the ground plane, the first FILE, and the second FILE; and a superstrate disposed on the first FILE, the second FILE, and the shorted via, the shorted via being connected to a proximal end of the first antenna conductive line opposite from the distal end of the first antenna conductive line, the shorted via being connected to a proximal end of the second antenna conductive line opposite from the distal end of the second antenna conductive line, the first FILE being a first radiating element, the second FILE being a second radiating element, the antenna element having an operating bandwidth of about 34 gigahertz (GHz) to about 94 GHz, the proximal end of the first antenna conductive line having a first hemispherical shape with a first curved portion and a first straight edge portion along an entirety of a diameter of the first hemispherical shape, the proximal end of the second antenna conductive line having a second hemispherical shape with a second curved portion and a second straight edge portion along an entirety of a diameter of the second hemispherical shape, the first antenna conductive line extending away from the shorted via in a first direction parallel to the ground plane, the second antenna conductive line extending away from the shorted via in a second direction parallel to the ground plane and perpendicular to the first direction, and the first straight edge portion of the proximal end of the first antenna conductive line directly facing an entirety of the second straight edge portion of the proximal end of the second antenna conductive line.

18. A dual-polarized ultrawideband antenna array, the antenna array comprising:

a plurality of unit cell antenna elements arranged in an array, each unit cell antenna element being the antenna element according to claim 17, the antenna array having an operating bandwidth of about 34 GHz to about 94 GHz.

19. The antenna array according to claim 18, the distal end of the first antenna conductive line of each non-edge unit cell antenna element of the plurality of unit cell antenna elements being spaced apart the proximal end of the second antenna conductive line of an adjacent unit cell antenna element by a predetermined gap, the predetermined gap being in a range of from 100 micrometers (μm) to 200 μm, and each unit cell antenna element of the plurality of unit cell antenna elements having a square shape with a side length of about 1.5 millimeters (mm).

* * * * *